April 12, 1927.
W. G. ALDEEN
1,624,648
COUNTERSINKING MACHINE
Original Filed Aug. 21, 1922     9 Sheets-Sheet 8
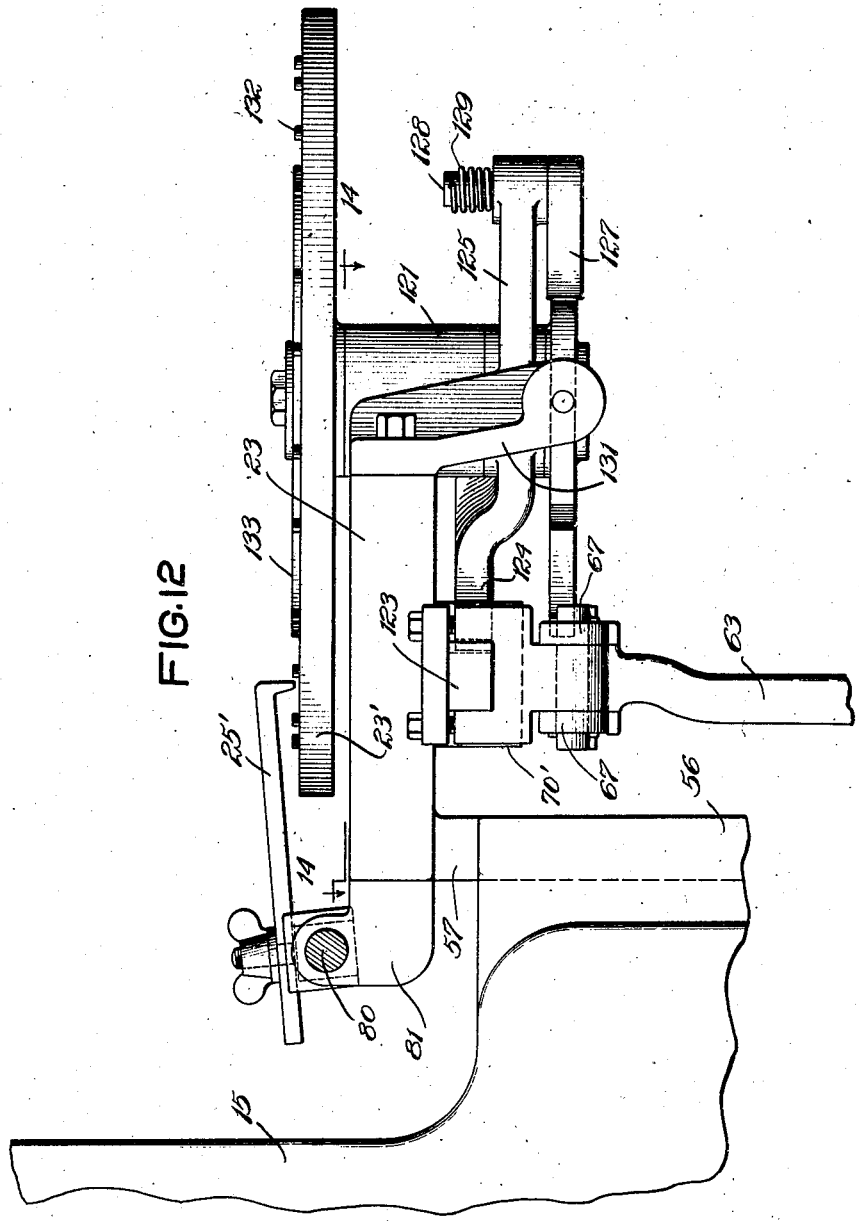
Witness
John E. Titus
Inventor
Wilhelm G. Aldeen
By Chindahl, Parker & Carlson
Attys

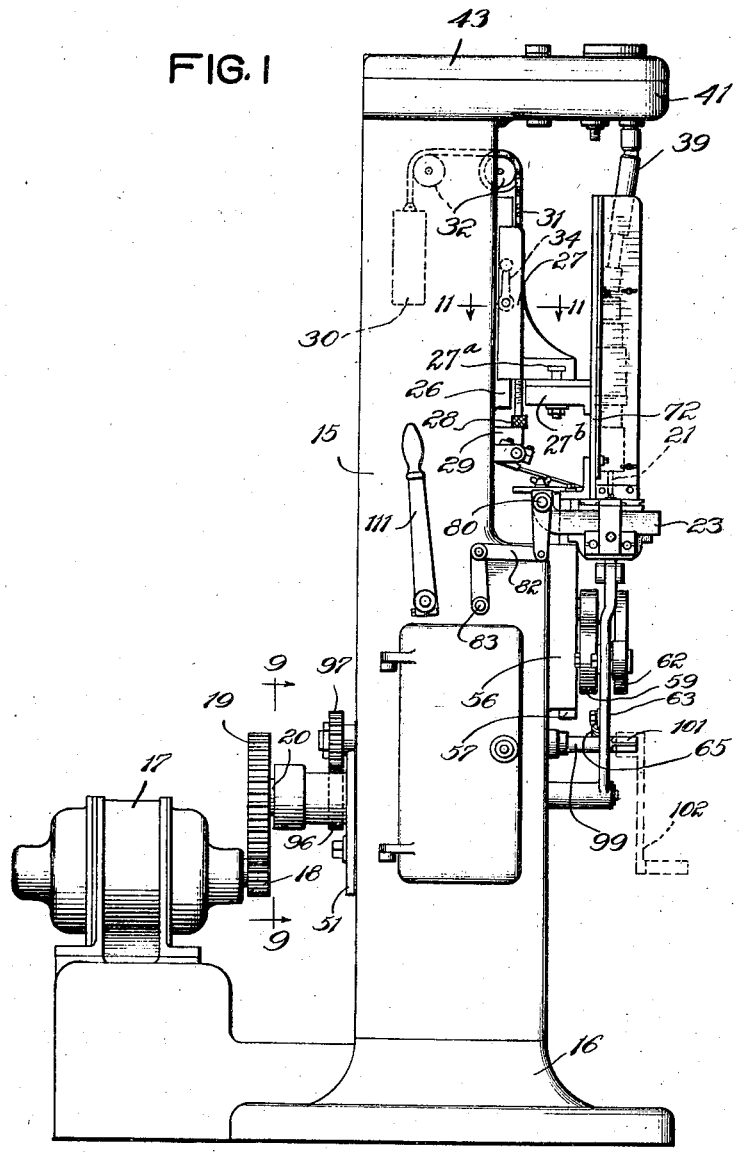

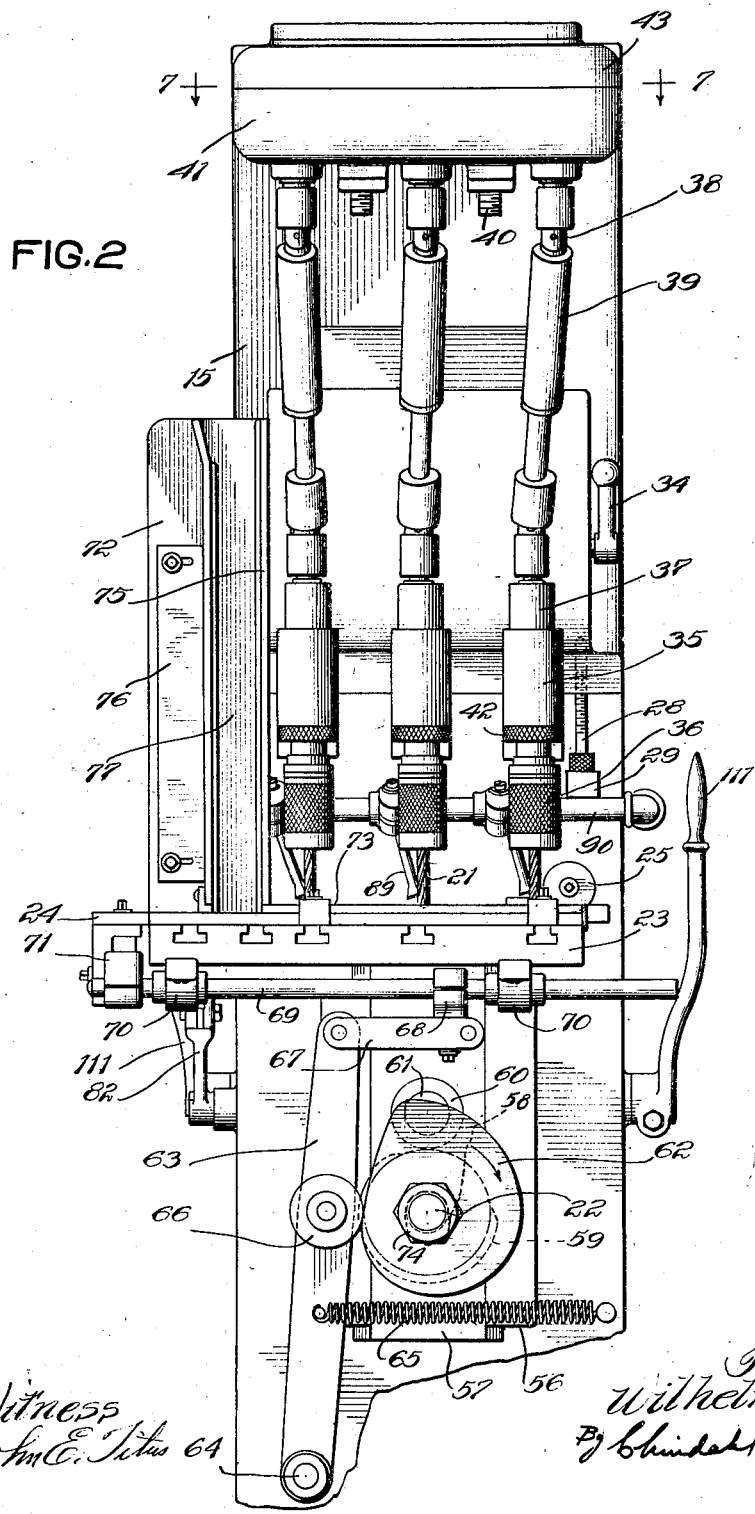

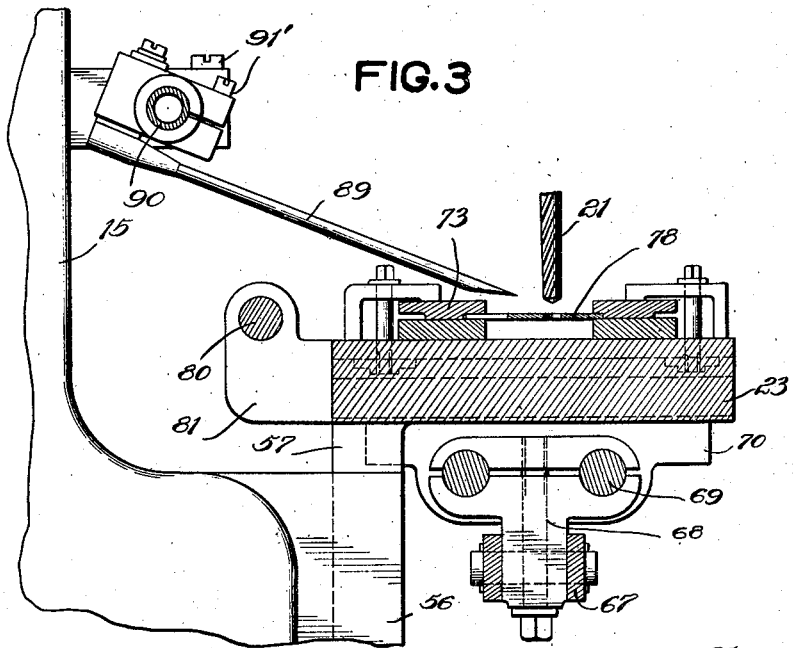
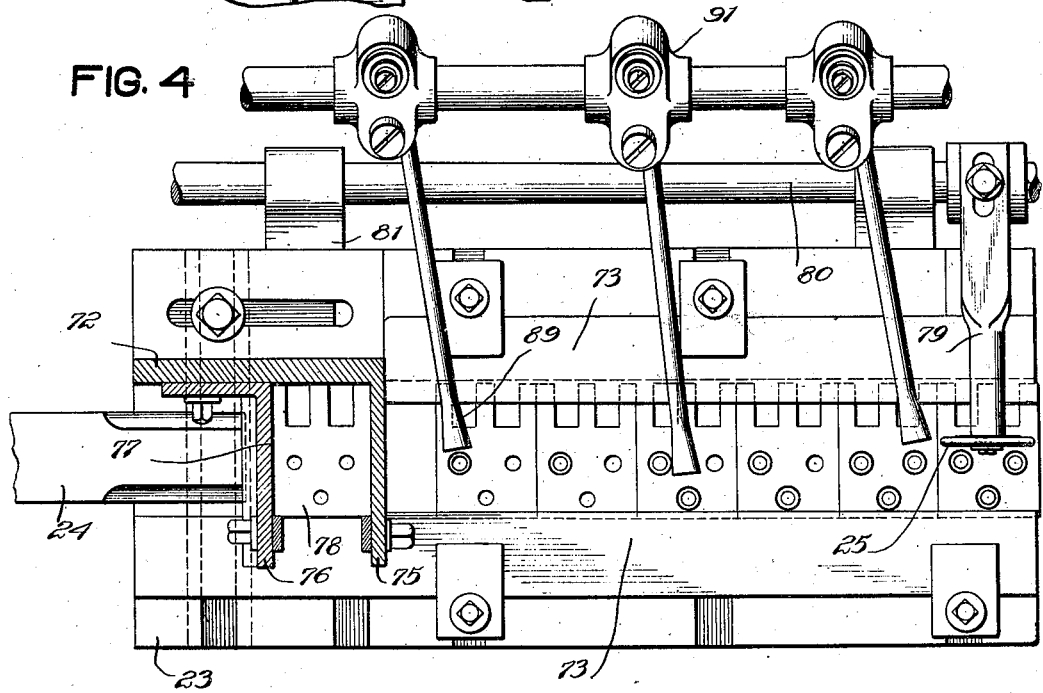

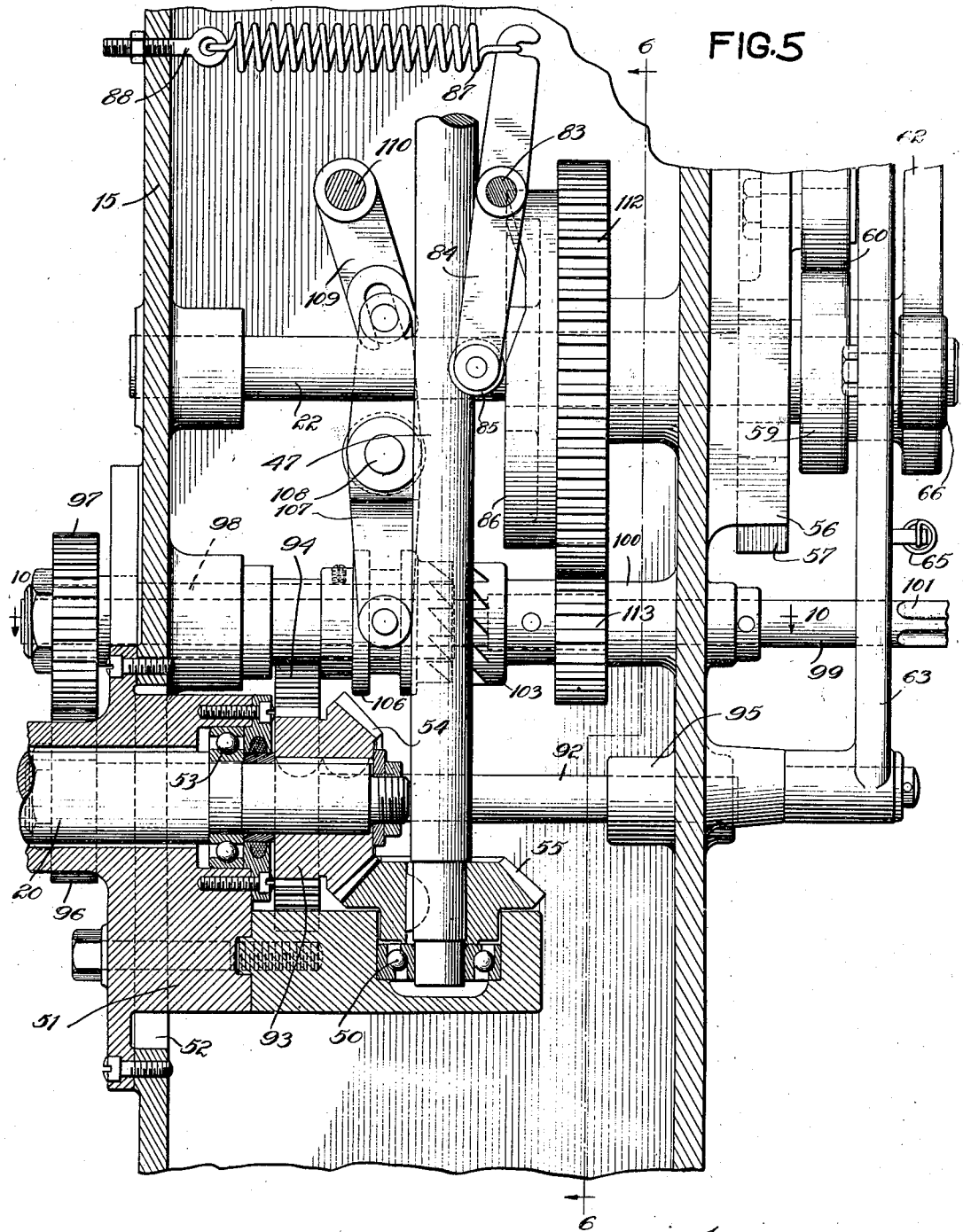

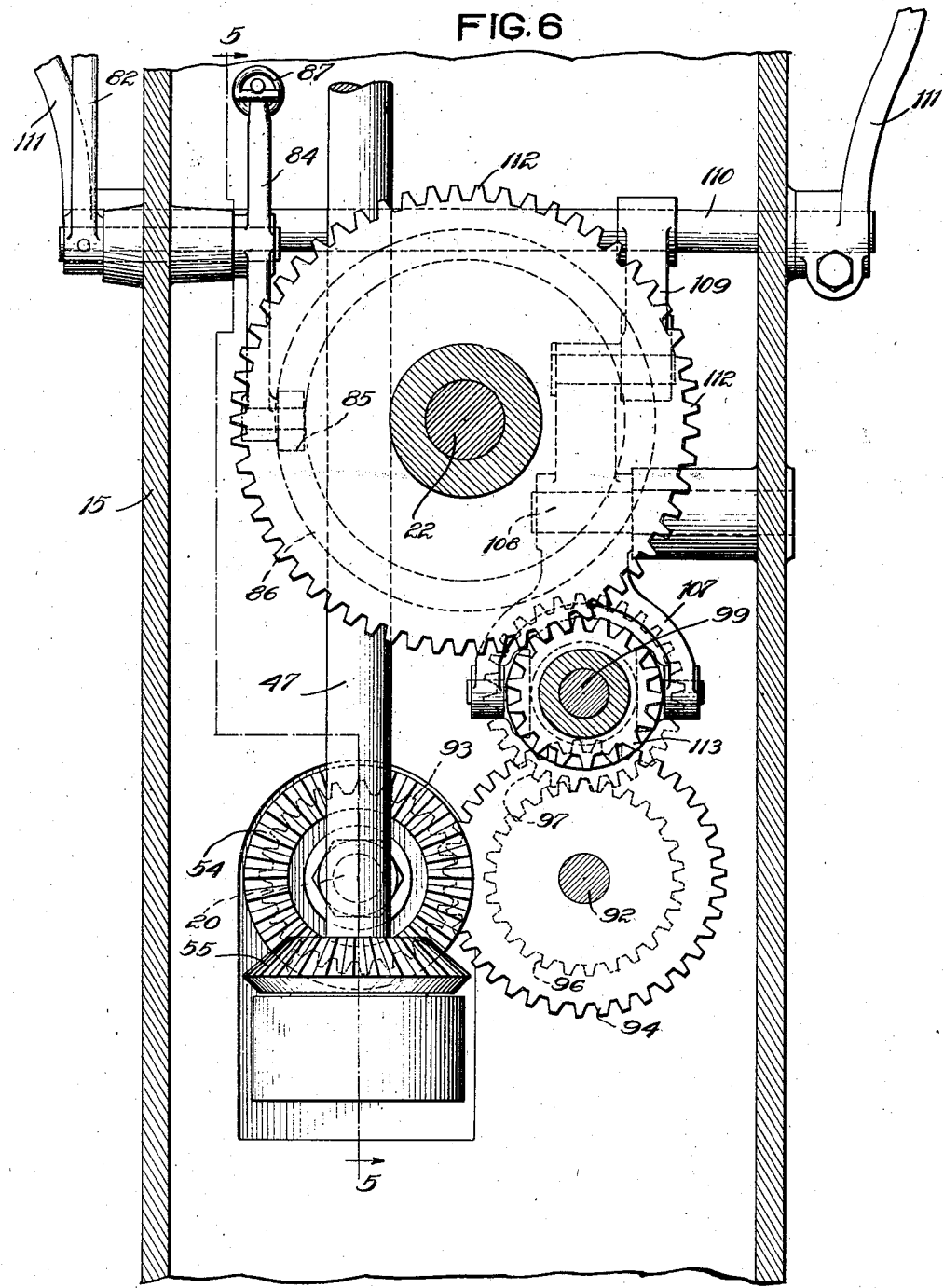

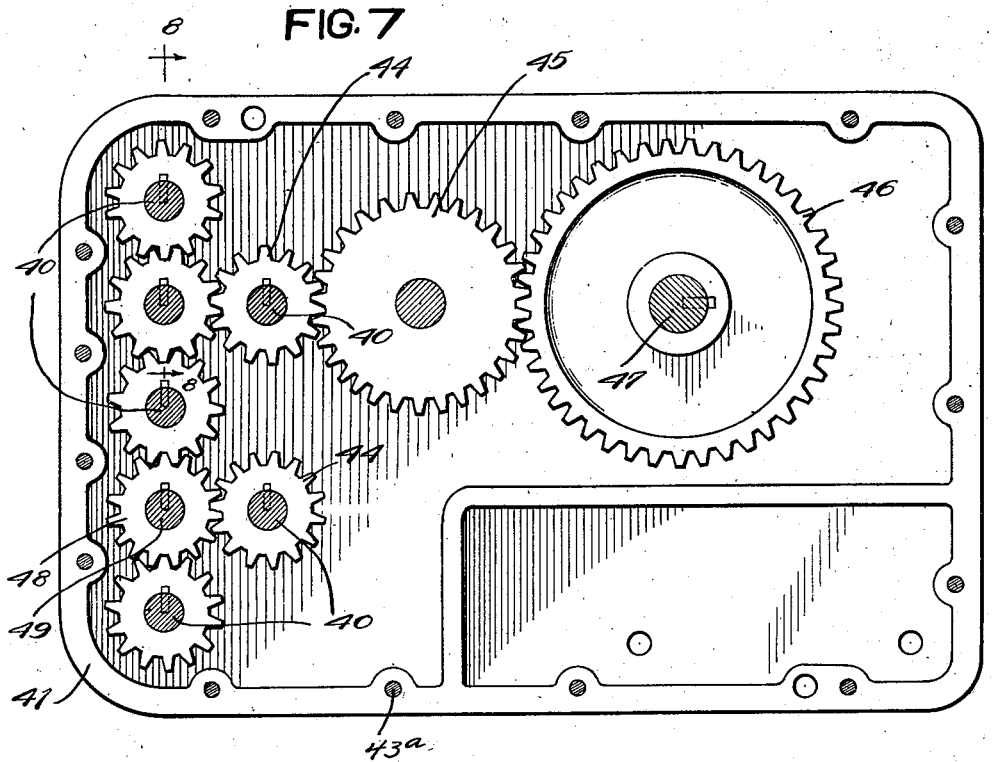
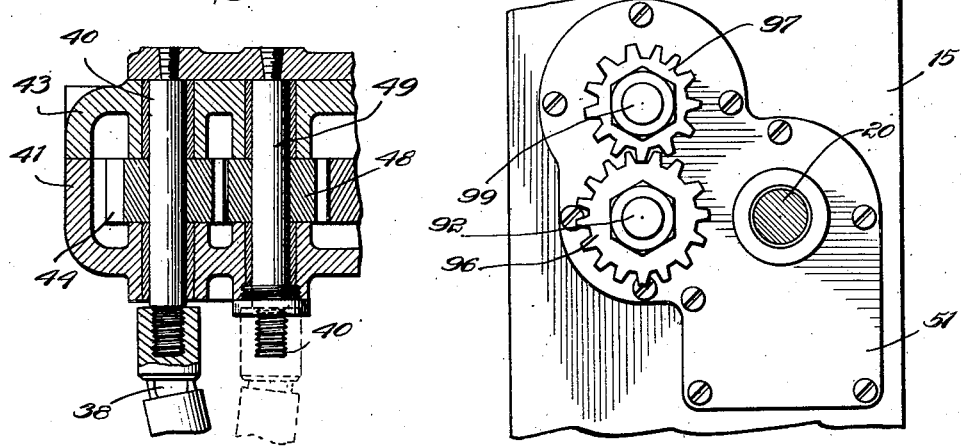

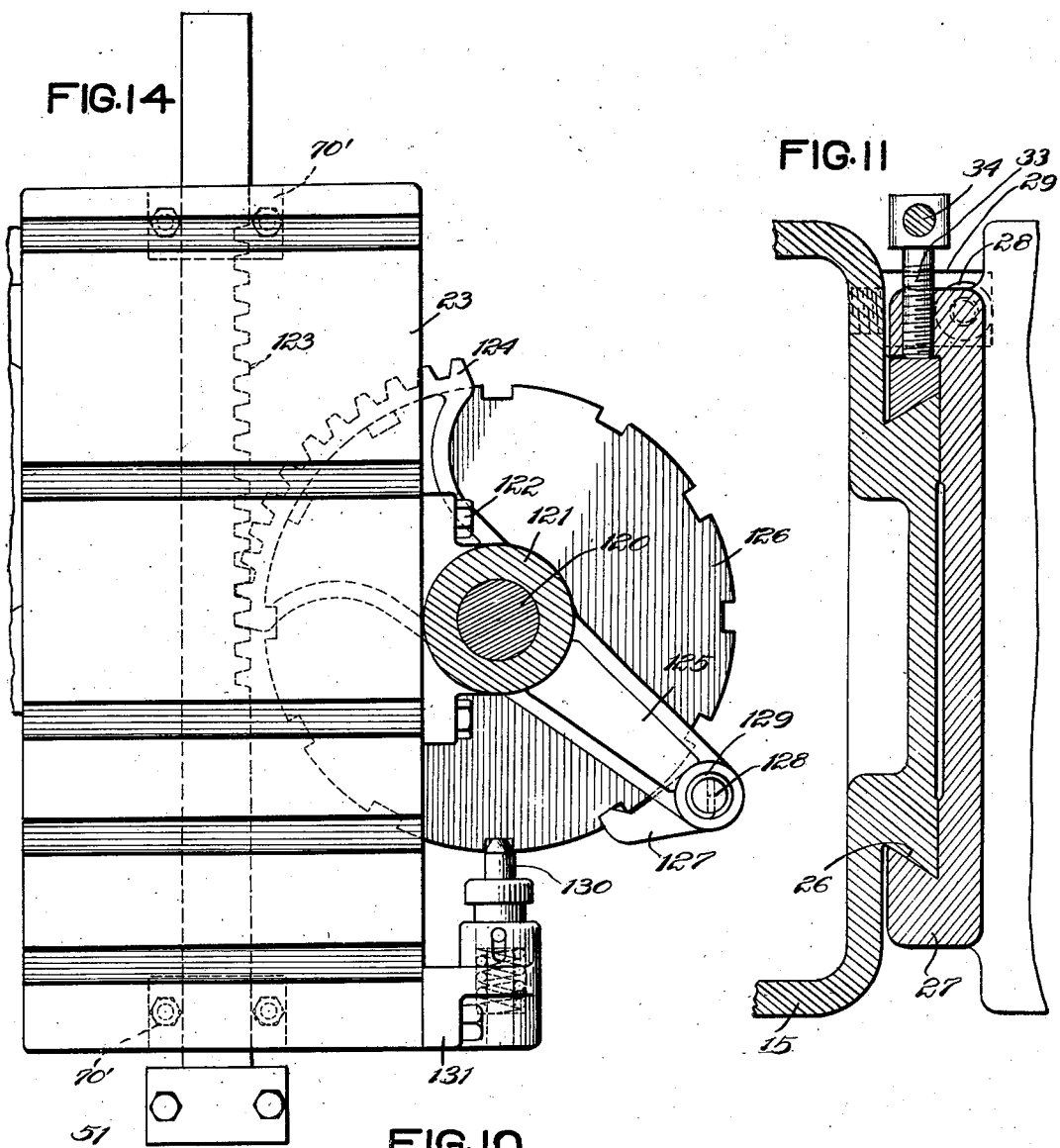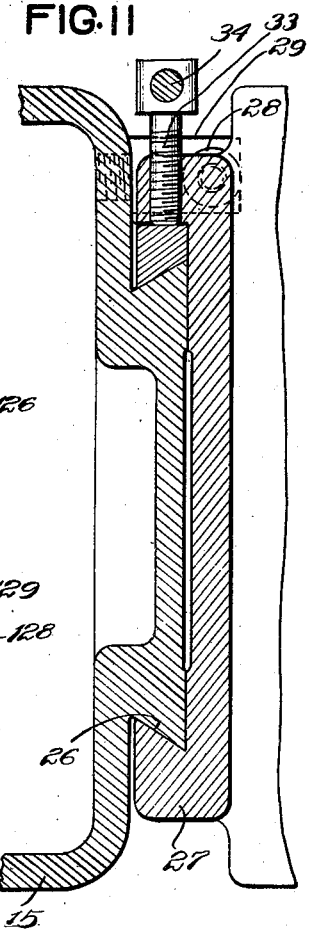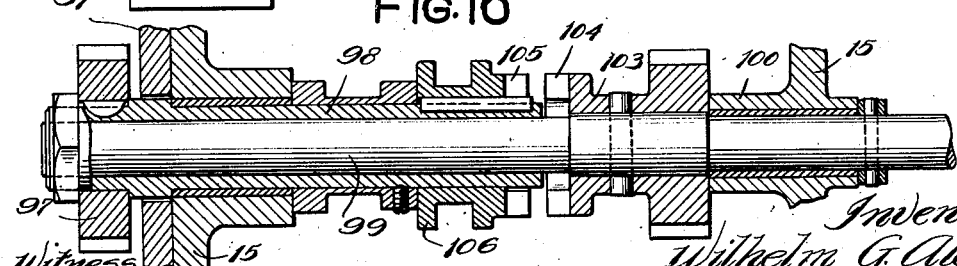

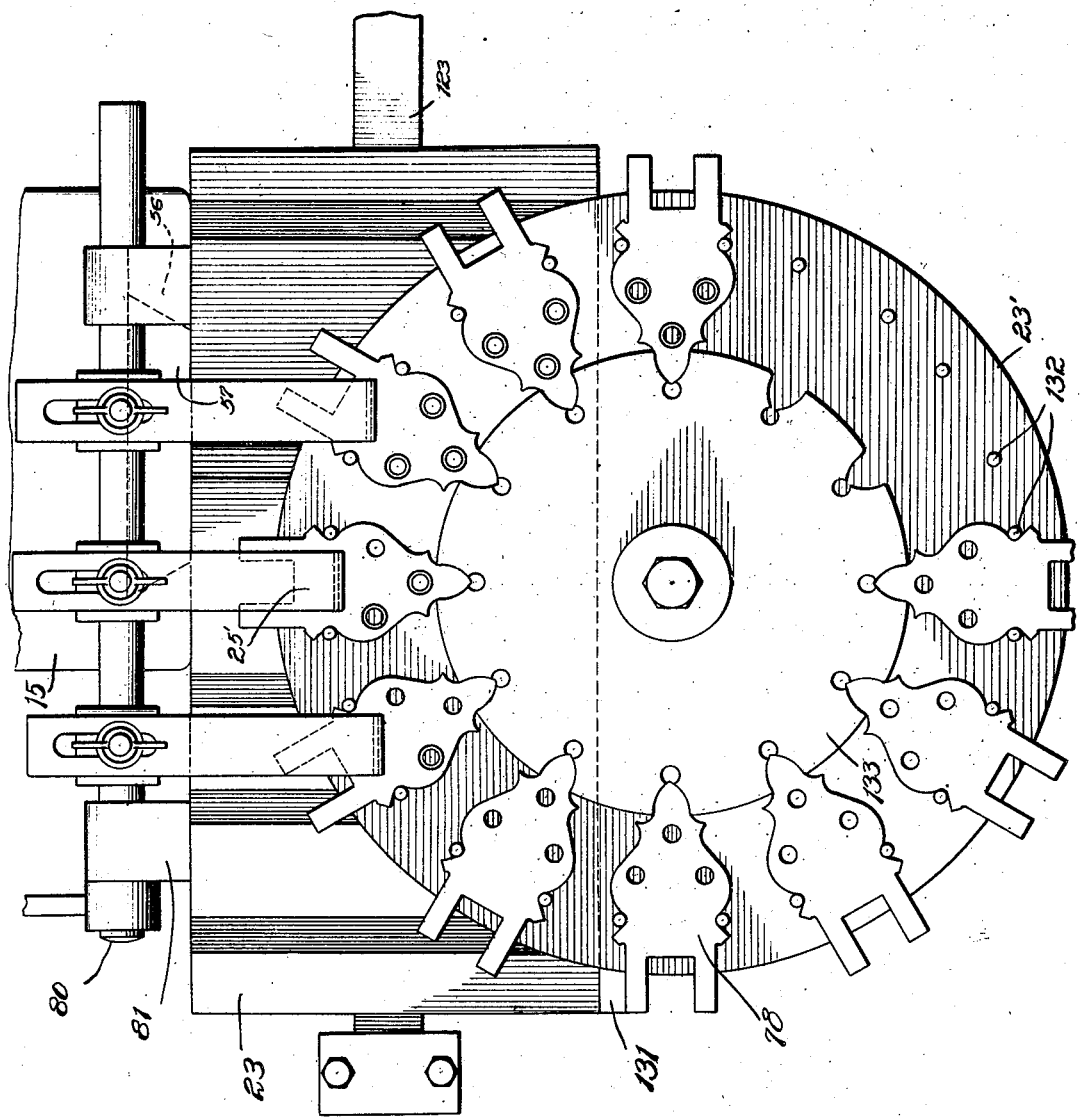

Patented Apr. 12, 1927.

1,624,648

UNITED STATES PATENT OFFICE.

WILHELM G. ALDEEN, OF ROCKFORD, ILLINOIS, ASSIGNOR TO NATIONAL LOCK CO., OF ROCKFORD, ILLINOIS, A CORPORATION OF DELAWARE.

COUNTERSINKING MACHINE.

Application filed August 21, 1922, Serial No. 583,177. Renewed October 22, 1926.

This invention relates to countersinking and counterboring machines generally and more particularly to a machine for countersinking hinges and the like.

The principal object of the present invention is to provide a countersinking machine employing constantly driven stationary countersinking drills and a relatively movable work support having associated therewith work feeding means and retarding means whereby the work is advanced intermittently across the support to be operated upon successively by the drills.

Another object of the invention consists in the novel arrangement employed wherein the tools are constantly driven in the normal operation of the machine and the work support elevating means, the hinge feeding means and the hinge retarding means are adapted in the normal operation of the machine to be operated continuously therewith except when the machine is being set for operation in which event the power drive for the work support elevating means, the hinge feeding means and the hinge retarding means is adapted to be disconnected so that these portions of the machine may be operated manually, and the machine put through a number of trial operations when adjustments are made.

Still another object of the invention is to provide in connection with the stationary constantly driven drills a relatively movable work support, means for moving the support, and means for feeding hinges across the support relative to the drills to be operated upon, both of which means are adapted for disconnection from the driving means to be interchanged in order to effect either a change in the depth of countersink or counterbore to be produced or to adjust the machine for operation on hinges of a different size or thickness, the machine being adapted for manual operation in the manner aforesaid in order to put the same through a few trial operations.

A further object of the invention resides in the provision in connection with the constantly driven drills of a relatively movable work support, a hinge feeding means and a hinge retarding means, all of which means are driven through suitable transmission from the same source from which the drills are operated, such transmission including adjustable speed transmission gearing whereby the relative speed of operation of the feeding means, retarding means and the work support elevating means may be varied.

A still further object of the invention is to provide in connection with the countersinking drills a plurality of blowers operating upon the points of the drills to clear the work of drillings and in a measure to keep the drills cool.

Other and more general objects of the invention are to provide a machine of this character capable of extensive adjustment for operation on different sizes and kinds of work and to provide a machine which is not apt to have parts thereof jammed in operation due to maladjustment.

The foregoing and other objects of the invention will be pointed out more fully in the following detailed description in which reference is made to the accompanying drawings illustrating the invention.

Figure 1 of the drawings is a side elevation of a complete machine embodying the features of the present invention. Fig. 2 is a front view on a slightly larger scale, a portion of the base of the machine being broken away. Fig. 3 is a fragmentary detail, partly in section and partly in side elevation, of the work support and the air nozzles shown in operative relation thereto, a portion also of a drill being shown to illustrate the relative positioning of the nozzles with respect to the drills and also with respect to the hinges in the work support. Fig. 4 is a plan view of the work support showing the hinge magazine in section. In this view there appears also a portion of the hinge feeding means, the hinge retarding means and the air nozzles, the latter being shown in the positions to which they are adjusted for clearing the work of drillings in the operation of the machine. Fig. 5 is a detail partly in section and partly in elevation of the driving connections for the drills, for the hinge feeding means, the hinge retarding means and the work support elevating means. This view is taken on the line of 5—5 of Fig. 6. Fig. 6 is a transverse sectional detail on the line 6—6 of Fig. 5. Fig. 7 is a horizontal section taken on the line 7—7 of Fig. 2. Fig. 8 is a fragmentary sectional detail of the driving connections for the separate drills and is taken on the line 8—8 of Fig. 7. Fig. 9 is a fragmentary detail taken approximately on the line 9—9 of Fig. 1 showing the variable speed transmission gearing for operating the secondary driven shaft from the main driven shaft of the machine. Fig. 10 is a horizontal sectional detail of the transmission mechanism and is taken on the line 10—10 of Fig. 5. Fig. 11 is another horizontal sectional detail of the tool support and is taken on the line 11—11 of Fig. 1. Figs. 12 and 13 are respective a side elevation and a plan view of a modified form of the invention, this form being in the nature of an attachment for the machine for operating upon fancy hinges, the butt hinge magazine, feeding means and retarding means being removed from the machine and replaced by others capable of operating on the fancy hinges. Fig. 14 is a horizontal section of the modified form of the invention, taken on the line 14—14 of Fig. 12.

Throughout the views the same or similar reference numerals apply to corresponding parts.

The invention is herein shown as embodied in a machine for countersinking hinges. As will hereinafter more definitely appear, the invention is not limited to use in this connection, but certain features thereof are adapted to use in drill presses and other machines of the same general character.

Referring to the drawings the machine comprises a standard 15 having the base thereof rigidly mounted upon the baseplate 16. The latter is of extended width and serves as a support for the electric motor 17 or other suitable power device for driving the machine. The motor 17 has a pinion 18 on its armature shaft meshing with the gear 19 on the main driven shaft 20 of the machine. This shaft as will presently appear serves as the source of power for the drills 21 and the cam shaft 22 from whence the work support 23 is arranged to be operated toward and away from the drills 21. This shaft serves also to furnish the power to operate the feeder 24 and the retarder 25. All of these portions of the mechanism of the machine will be hereinafter more fully described. The standard 15 is provided with a dovetailed projection 26 upon which is mounted for vertical adjustment a normally stationary tool support 27. The adjustment is secured by means of a jack screw 28 operating against an abutment 29 on the standard 15 to raise the support. The support is counterbalanced by a weight 30 connected by means of a chain 31 to the support, the chain passing over suitable idler sprockets 32. When properly positioned the support is arranged to be clamped by the set screw 33 operated by the hand lever 34. The tool support 27 has a lateral T-slot 27ª provided therein to provide means for attachment and adjustment of one or more brackets 27ᵇ. These brackets are universally adjustable sidewise and forwardly and rearwardly with the bearing portions 35 to produce adjustment of the chucks 36 for the drills 21.

The chucks 36 are mounted upon the ends of spindles 37 turning in the bearings 35 and driven through universal joints 38 and extensible shafts 39 from the driven studs 40 having bearings in and projecting from the overlying casing 41 forming a part of the standard 15 and cast preferably integral therewith. A slight degree of longitudinal adjustment of the spindles 37 in the bearings 35 may be provided by knurled hand nuts 42. This adjustment serves to take up end play in the shaft between the chucks and the driven studs 40 so that the chucks are driven uniformly and without vibration. The smooth operation of the drills is, of course, important in that it permits the necessarily fine adjustment for the depth of countersinks to be made in the work. The studs 40 as aforesaid are received in bearings in the casing 41. There are also bearings therefor provided in the removable cap plate 43 secured preferably by cap screws 43ª to the casing 41. The studs 40, of which there are in this instance five, mounted in the casing 41, are driven by pinions 44 from the gear 45 meshing with the gear 46 keyed to the vertical driven spindle 47. There are intermediate pinions 48 on studs 49 between each of the drill studs 40 serving to drive the drill studs all in the same direction. The spindle 47 extends centrally inside the standard 15 as shown in Fig. 5 and is received in a suitable thrust or end bearing 50 supported from the plate 51 set in the opening 52 in one wall of the standard 15. A bearing 53 is mounted in this plate to receive the end of the main driven shaft 20. A driving connection between the shaft 20 and the spindle 47 is afforded by the bevelled gear 54 keyed to the inner end of the shaft 20 and a bevelled gear 55 keyed to the lower end of the spindle 47 at the bearing 50. It will thus appear that in the operation of the machine the drills 21 are constantly driven.

The work support 23 is mounted for movement toward and away from the drills 21 in the ways 56 formed preferably integral on the side of the standard 15 at the lower front thereof. The support 23 has a dovetailed depending plate 57 operating in the ways 56 and having a slot 58 to permit movement of the plate in the ways relative to the cam shaft 22 which extends through the slot 58. The shaft 22 has a cam 59 thereon, the throw of which is relatively slight as will be noted from Fig. 2 so as to communicate only a slight rise to the work support 23 through the medium of the roller 60 mounted on a stud 61 on the front of the plate 57 and operating upon the periphery of the cam 59. The cam 59 may be formed as part of a compound cam of which the cam 62 on the shaft 22 is also a part. The cam 62 has a relatively great throw to swing the lever 63 on its pivot 64 against the tension of a spring 65 through the medium of a roller 66 mounted on a stud provided on the lever 63. The lever 63 has connection suitably through links 67 with a bracket 68 clamped upon and arranged for adjustment relative to a pair of parallel rods 69 mounted to reciprocate in bearings 70 upon the nether side of the work support 23. Mounted upon the outer ends of the parallel rods 69 and arranged suitably for adjustment thereon is a standard 71 for the feeder 24. The latter is in the form of a ram arranged to reciprocate relative to a magazine 72 mounted for universal adjustment at one end of the work support 23, the purpose being to feed the pieces of work one at a time out between the guides 73 to be operated upon by the drills 21 when the work support is properly elevated.

The cams 62 and 59 are usually special for each particular job since the depth of the countersink to be produced usually varies for each job and also the width of the hinges to be fed through the machine to be operated upon. It is, therefore, manifest that it will frequently be necessary to replace these cams by other cams having the proper characteristics for the particular job in hand. These cams may both very readily be removed from the shaft 22 by removing the nut 74. Pursuant to the replacement of the cams, certain adjustments of the drills and also certain adjustments of the bracket 68 relative to the rods 69 would, of course, be necessary in order properly to position the work support relative to the drills at the point of engagement of the drills with the work and also properly to bring the work in register with the drills successively in the operation of the feeder. I contemplate providing for this purpose a means whereby the cam shaft may be turned by hand during the continuous power operation of the drills, to put the machine through a few trial operations in order to determine whether the adjustments have been made correctly. This arrangement will be described presently.

Referring for a moment to Fig. 4, it will be seen that the magazine 72, which as aforesaid is adjustable in transverse directions at one end of the support 23, has a forwardly projecting wall 75 in relation to which an angle plate 76 is adjustable on the back wall of the magazine 72. This is to afford a chute 77 down which the hinge blanks are fed to the support to be countersunk. A number of these blanks designated by the numeral 78 are shown in Fig. 4. The feeder 24 operates beneath the wall 75 and the adjustable plate 76 of the magazine 72 and is adapted to project the blanks one at a time from the lower end of the stack of blanks in the magazine out between the guides 73. The blanks illustrated are for butt hinges which are especially well adapted to be fed in this manner since they are rectangular and when positioned side by side between the guides, as shown in Fig. 4, are adapted for intermittent advancement across the support by the successive introduction of the blanks. The stroke of the feeder 24 is adjusted so that the blank being fed is projected in just far enough to move the row of blanks until the new blank assumes the erstwhile position of the first blank of the row which, as shown in Fig. 4, has had one of the screw holes thereof countersunk. The operations are repeated, the blanks being fed successively from one drill to the next, until all three of the screw holes thereof have been countersunk. The machine with the mechanism for driving the drills thereof shown in Fig. 7 is capable of countersinking as many as five screw holes in a blank, and these screw holes may, of course, be located in practically any desired relation since the drills are capable of substantially universal adjustment relative to the work support by virtue of the mounting which they have in the tool support and further by virtue of the staggered relation of the driven studs 40. It is, of course, apparent that a greater number of studs for driving drills may be provided if desired.

The hinge blanks as aforesaid are fed in the reciprocation of the feeder 24. Such reciprocation is controlled by the cam 62. The latter is arranged to positively retract the feeder when the work support is being elevated by the cam 59 in the cutting operation. When the work support is lowered, the cam 62 permits the inward projection of the feeder under the action of the spring 65. In this way there is no likelihood of jamming in the event of a hinge blank becoming stuck between the guides 73 or at the lower end of the chute 77 either because it has been improperly formed or where by accident a blank of improper thickness has gotten in the stack which could not, of course, be projected out in between the guides 73. In such event the machine would go through a number of operations idly so that the operator would have an opportunity to remedy the trouble without any damage being done.

The feeder 24 having only a small interval in which to introduce a new blank between the guides 73 operates necessarily rather quickly particularly when the machine is being run at some of the higher speeds at which it is capable of being run as, for example, when high speed transmission gearing is interposed for operating the cam shaft 22 as will hereinafter be described. As a consequence of this mode of operation of the feeder, I have found it advisable to provide the retarder 25 which is preferably in the form of a roller mounted upon the end of an arm 79 arranged to swing in the oscillation of a shaft 80 received in bearings 81 projecting rearwardly from the work support 23. This shaft oscillates in proper timed relation to the reciprocation of the feeder 24 to bring the retard roller 25 into frictional engagement with the endmost blank in the row of blanks being advanced between the guides 73. The operation of the retarder is so regulated that the blanks will not under any circumstance move in beyond where they are moved by the feeder 24. In other words, the row of blanks is advanced the width of one blank at each operation of the feeder 24. The shaft 80 is oscillated through suitable linkage, shown at 82, in the oscillation of a stub shaft 83 mounted in a bearing in the said wall of the standard 15. A rocker arm 84 rigid with the shaft 83 carries a roller 85 at its free end which is urged into engagement with the face of a cam 86 keyed to the shaft 22, under the action of a spring 87 having connection between the opposite end of the rocker arm 84 and an eye-bolt 88 adjustable in the rear wall of the standard 15.

Associated with each of the drills 21 is an air nozzle 89. The latter extend to a point alongside the ends of the drills 21 and in the general direction of the screw holes to be countersunk. They serve principally to clear the work of the drillings but incidentally are instrumental in keeping the drills relatively cool since the blasts of air therefrom operate on them continuously. These nozzles communicate with the pipe 90 through swivel connections 91 the details of which it will not be necessary to consider in this specification. It will suffice to state that these connections afford communication for the nozzles with the bore of the pipe 90 in all relative positions to which the nozzles are moved in practice. The set screws 91' afford means for clamping the parts in adjusted relation. The pipe 90 will, of course, have connection through a suitable line with a source of air pressure supply which is usually available around shops where machines of this kind are operated.

The main driven shaft 20 is arranged for detachable driving connection with the cam shaft 22 in order to permit of the manual operation of the latter in setting the machine for operation. The main driven shaft 20 which, as above described, serves to drive the drills 21 through the spindle 47 drives a countershaft 92 by means of the gear 93 formed preferably integral with the bevelled gear 54 and meshing with the spur gear 94 keyed or otherwise made rigid with the countershaft 92. The countershaft 92 is mounted in a bearing 95 in the front wall of the standard 15 and is received in a bearing in the removable plate 51 which, as before stated, is mounted in the opening 52 in the rear wall of the standard 15. A pinion 96 on the end of the countershaft 92 meshes with a pinion 97 keyed upon a sleeve 98 arranged to turn freely on the jack shaft 99. The latter extends forwardly through a bearing 100 in the front wall of the standard 15 and is squared at its outer end, as shown at 101, to receive a hand crank 102 or other means for turning the shaft manually in setting the machine for operation. The crank 102 is shown in dotted lines in Fig. 1 and, it will be understood, is removed after the machine is properly set since the shaft 99 in the normal operation of the machine is driven from the shaft 20 through the transmission gearing just described. The driving connection with the shaft 99 is afforded by a clutch collar 103 pinned upon the shaft and having clutch teeth 104 arranged to mesh with the teeth 105 of the shiftable collar 106. The latter, as shown in Fig. 10, is splined upon the sleeve 98 and arranged to be shifted freely into engagement with the collar 103. This movement of the collar 106 is communicated by a yoke 107 pivoted upon the stud 108 projecting inwardly from one of the side walls of the standard 15 as shown in Fig. 6. The yoke 107 is operated conveniently by a forked arm 109 arranged to swing in the oscillation of the shaft 110. The latter extends through bearings in the opposite side walls of the standard 15 and is operable at either end by hand levers 111. Upon proper operation of the clutch 106 the shaft 22 is driven from the countershaft 99 through the meshing engagement of the spur gear 112 with the pinion 113 rigid with the shaft 99 and formed preferably as an integral part of the driven clutch collar 103. It is therefore apparent that the operator has it at his option to drive the cam shaft 22 either manually by turning by crank the shaft 99 or upon proper manipulation of either of the levers 111, which are within convenient reach at either side of the machine, may drive the cam shaft by power. When the clutch 106 has been disengaged the cam shaft 22 is thereby disconnected from driving relation and the operator is enabled either to make adjustments of the blank feeding and retarding means or the means for elevating the work support, or he may replace the cams 59 and 62 by other cams having the desired characteristics for operation upon the special work in hand.

In operating upon certain kinds of work as, for example, where only a single hole in each piece is to be countersunk or where for other reasons the work is to be advanced through the machine in quicker succession, it is necessary or at least desirable to operate the machine at a faster rate. I therefore employ adjustable speed transmission for the operation of the cam shaft 22 from which shaft the blank feeding and retarding means is operated and, as well, the work support elevating means. In this way it is possible to secure variations in the relative speeds of the shaft 20 and the shaft 22 by interchanging the gears 96 and 97 (see Fig. 9) with other gears of the desired relative sizes. This replacing of gears can, of course, be done only when the machine is not in operation. Ordinarily the speed at which the drills are operated may remain constant. However, where because of the increase in the speed of operation of the blank feeding and retarding means or because of a change in the depth of the counterbore to be produced or where the machine is to operate upon certain materials requiring high speed drills, it would be practicable to change the gearing for the spindle 47 in an obvious manner.

The operation of the machine is practically apparent from the foregoing description. Work stacked in the magazine 72 is fed between the guides 73 on the work support 23 when the latter is in its lowermost position away from the points of the drills 21. The reciprocating feeder 24 which introduces the blanks one by one advances the row of blanks already in the guides successively from drill to drill so that first one hole is countersunk, then a second and finally a third, as illustrated in Fig. 4. At about the end of the stroke of the feeder 24 the retarder 25 engages gently the endmost blank in the row of blanks between the guides so that there can be no continued movement of the blanks out of proper registered relation with respect to the drills at the end of each feeding stroke. The cam 62 which operates the feeder 24 is properly disposed angularly with respect to the cam 59 so that when the feeder is in retracted position the work support with the blanks in their respective advanced positions is raised toward the drills 21. The cam 59 has, of course, a gradual rise after the point of engagement of the drills with the work so that a clean cut is insured and possible breaking of the drills by jamming avoided. The feeding of the blanks is impositive so that in the event of a blank becoming lodged either at the bottom of the magazine or at any point between the guides the machine itself will not in any way be damaged. In fact, injury to the work may be avoided in such a contingency by the operator throwing either of the levers 111 which for this reason are provided on both sides of the machine within easy reach. The manner of varying the speed of operation and the manner of adjusting the machine preparatory to operation has been fully described.

The machine of the present invention is capable of operating upon hinges or the like of irregular shapes. In operating on such hinges I prefer to employ a separable attachment such as that shown in Figs. 12 to 14. This attachment comprises an auxiliary work support in the form of a dial 23' mounted to rotate with a central vertical spindle 120 operating in the bearing 121 fastened suitably by cap screws 122 upon the front of the work support 23. The latter is arranged for movement with the dial 23' toward and away from the drills 21, in the operation of the cam 59 against the roller 60 on the plate 57 movable in the guideways 56. The actuating lever 63 operated by the crank 2, is connected by the links 67 to a rack bar 123 which, like the rods 69, is reciprocable in bearings 70' on the under side of the work support 23. Meshing with the teeth of the rack bar is a gear sector 124 adapted to oscillate upon the spindle 120 beneath the bearing 121. An arm 125 is rigid with the gear sector 124 and extends diametrically therewith on the opposite side of the spindle 120 to swing in a horizontal plane above a ratchet plate 126 keyed or otherwise made rigid with the spindle 120 to rotate the same intermittently. The ratchet plate is notched in its periphery to receive the pawl 127 pivotally mounted on a stud 128 on the end of the arm 125 and normally urged into engagement with the plate 126 by the torsion spring 129. In the oscillating movement of the gear sector 124 which is communicated in the reciprocation of the rack bar 123 the pawl 127 advances the plate 126 and hence the dial 23' intermittently step by step. A suitable detent such as that shown at 130 is spring pressed into engagement with the periphery of the plate 126 and is arranged upon each operation of the pawl 127 to ride out of one notch and into the next notch of the plate to stop the same at each intermittent rotation thereof. This detent is suitably supported by the bracket 131 from the work support 23. In the intermittent advancement of the dial 23' the blanks 78' are advanced successively from one drill to the next so that first one hole is countersunk, then a second, and finally a third, in the manner illustrated in Fig. 13. The blanks may conveniently be positioned between pegs 132 with their ends received in notches in the plate 133, as shown. The operator standing at one side of the dial will remove the blanks with one hand and place new blanks between the pegs with the other hand. The blanks in being advanced beneath the drills are preferably retarded by means of the overhanging arms 25' adjustable angularly with respect to the shaft 80 arranged to oscillate in the bearings 81 extending rearwardly from the work support 23. One of these arms is provided adjacent each of the drills. It serves not only to retard the work in its advancement beneath the drills but likewise to prevent possible chattering of the blank upon engagement of the point of the drill in the hole to be countersunk.

The operation of this form of the invention is apparent. The lever 63 similarly as in the preferred form swings to and fro and thereby reciprocates the rack bar 123. This reciprocating motion communicates rotary movement to the spindle 120 through the sector 124 and the pawl 127 to intermittently turn the dial 23' to advance the work beneath the drills. After each advancement of the work the dial 23' with the support 23 is raised to the drills similarly as in the preferred form. With this form of the invention it is, of course, manifest that the cam for operating the lever 63 and the cam for operating the work support 23 may be interchanged with other cams having the desired characteristics. Furthermore, the cam shaft on which these cams are mounted may conveniently be driven at different speeds through the variable speed transmission above described so that the work may be advanced in quicker succession beneath the drills similarly as in the preferred form.

It will be apparent from the foregoing description that the invention is capable in certain respects of modifications and adaptations without departing from the spirit of the invention. It is the endeavor in the accompanying claims to include all legitimate modifications and adaptations of the invention which would occur to one skilled in the art to which the invention relates.

I claim as my invention:

1. In a machine of the character described, the combination with relatively movable work and tool supports, tools operating in said tool support, a feeder for feeding work across said work support in relation to said tools, a retarder adapted to operate upon each operation of said feeder to stop the work in relation to said tools, and means for producing relative movement between said supports in the cutting operation, of means for operating said feeder and retarder and said first mentioned means, a main shaft for driving said tools continuously at substantially constant speed in the operation of said machine, a secondary shaft driven from said main shaft to operate both said means, and in adjustable speed transmission between said main and secondary shafts, said transmission including a clutch adapted to be released to permit the manual operation of said secondary shaft to operate said feeder and retarder and said means for producing relative movement between said supports during the continued operation of said tools from said main shaft.

2. In a machine of the character described, the combination with relatively movable work and tool supports, tools operating in said tool support, a feeder for feeding work across said work support in relation to said tools, a retarder adapted to operate upon each operation of said feeder to stop the work in relation to said tools, and means for producing relative movement between said supports in the cutting operation, of means for operating said feeder and retarder and said means for producing relative movement between said supports, a main shaft for driving said tools continuously at substantially constant speed in the operation of said machine, a secondary shaft driven from said main shaft to operate said last mentioned means for operating said feeder, retarder and said means for producing relative movement between said supports, and adjustable speed transmission between said main and secondary shafts.

3. In a machine of the character described, the combination with relatively movable work and tool supports, tools operating in said tool support, a feeder for feeding work across said work support, a retarder to stop the work in register with said tools after each operation of said feeder, and means to produce a certain amount of relative movement between said supports in the cutting operation, of a main shaft for operating said tools continuously in the operation of said machine, a secondary shaft for the operation of said feeder and retarder and said means for producing relative movement between said supports, and adjustable speed transmission between said main and secondary shafts whereby to operate said feeder and retarder and said means for producing relative movement between said supports at variable speeds in the continued constant driving of said tools in the operation of said machine.

4. In a machine of the character described, the combination of a stationary tool support arranged for vertical adjustment, tools mounted therein arranged for horizontal adjustment, a work support movable toward and away from said tool support, an elevator for said work support, a magazine for work adapted to supply the work at one end of said work support, a reciprocatory feeder mounted for movement over said support adjacent said magazine to move pieces of work one by one across said support beneath said tools, a retarder at the opposite end of said work support operable upon each operation of said feeder to prevent more than the amount of movement of the work communicated by the feeder, said tools being spaced to operate in succession on the work as the pieces are fed intermittently across said support in the operation of said feeder, a main driven shaft for operating said drills continuously in the operation of said machine, a secondary shaft, and transmission from said main shaft for operating said secondary shaft to operate said elevator, feeder and retarder, said transmission including a clutch adapted to be released to permit the manual operation of said secondary shaft to operate said elevator, feeder and retarder during the continued operation of said tools to permit adjustment of said elevator, feeder and retarder in setting said machine for operation.

5. In a machine of the character described, the combination of a tool support, tools operating therein in spaced and staggered relation for operation on different portions of the work, a work support in proximity to said tools, means adapted to introduce work forcibly upon said support after each cutting operation, the pieces of work upon said support being adapted upon the introduction of each new piece to be advanced step by step from tool to tool in a succession of operations of said machine whereby different portions thereof are operated upon, and a retarding element adapted after each operation of said feeder to engage the end one of the series of pieces of work on said support to stop the pieces in proper relation to said drills.

6. In a machine of the character described, in combination with a tool support, tools operating therein, a work support in proximity to said tools adapted to support work to be operated upon by said tools, means adapted to introduce a new piece of work upon said support after each operation of said tools, said tools being arranged in spaced and staggered relation whereby each is adapted to operate upon a different portion of a piece of work, said work being adapted upon the introduction of each new piece of work to be advanced step by step from tool to tool in a succession of operations of said machine.

7. In a machine of the character described, the combination of a stationary drill support, drills operating therein in laterally spaced and staggered relation, each to operate upon a different portion of a piece of work, a work support movable toward and away from said drills, said support having guides to receive and hold work to be operated upon, a magazine for work alongside said guides, a reciprocatory member adapted to feed a piece of work from said magazine to said guides, means for moving said work support with said work thereon toward said drills, means for positively moving said reciprocatory member to retarded position upon this movement of the work support, and yielding means adapted to operate said reciprocatory member to feed another piece of work when said work support recedes from said drills, each of said pieces of work being adapted to advance preceding pieces through said guides from drill to drill.

8. In a machine of the character described, the combination of a stationary tool support, a tool operating therein, a work support movable toward and away from said tool, said support having guides to receive and hold work to be operated upon, a magazine for work alongside said guides, a reciprocatory member adapted to feed a piece of work from said magazine to said guides, means for moving said work support with said work thereon toward said tool, means for positively moving said reciprocatory member to retarded position upon this movement of the work support, and yielding means adapted to operate said reciprocatory member forwardly to feed another piece of work when said work support recedes from said tool.

9. In a machine of the character described, the combination of a power driven element, a cutter tool having driving connection therewith to be driven constantly in the operation of the machine, a work support, adjustable work feeding means, and adjustable cutting stroke feeding means, both of said feeding means having driving connections with said power driven element in the normal operation of said machine but adapted to be disconnected therefrom for manual operation to permit the adjusting thereof in setting said machine for operation.

10. In a machine of the character described, the combination of a power driven element, a tool, transmission between said element and said tool providing for constant driving thereof in the operation of the machine, a work support, means for feeding work upon said support, means for producing relative movement one toward the other of said work support and said stool in the cutting operation, transmission between said power driven element and said last two mentioned means providing for detachable driving connection therewith, and a manually operable element for operating said means upon disconnection thereof from said power driven element.

11. In a countersinking machine, the combination of a stationary tool support, a countersinking drill mounted therein to be adjusted relative to said support, a vertically movable work support disposed beneath said tool normally in spaced relation thereto to have work fed thereon, a reciprocating feeder to feed work onto said support in its lower position, and a member to lift said support to feed said work toward said tool, said member being adapted to be interchanged whereby to change the lift of said support and thereby the depth of countersink produced by said tool.

12. A machine of the character described having, in combination, a base, an operating mechanism having a plurality of tools mounted on said base, a support mounted on said base below said tools, a pair of guide strips mounted on said support and constituting a continuous guideway through the machine, a magazine mounted on one end of said guideway, a feeding member reciprocable in said guideway, said member being operable to periodically remove a work blank from said magazine and to simultaneously advance a series of blanks along said guideway, means for effecting a relative reciprocatory movement between said operating mechanism and said support, and means for actuating said feeding member and said last mentioned means in timed relation.

13. In a machine of the character described, the combination of a stationary vertically adjustable tool support, a relatively movable work support adapted to have work fed thereacross to be operated upon, a plurality of tools adapted to be arranged in relation to said tool support to operate over any point on said work support, bearings for said tools universally adjustable in a horizontal plane relative to said tool support, and a plurality of air nozzles stationarily mounted relative to said tools each adjustable universally relative to a tool to operate continuously upon the cutting portion thereof whereby to keep the same relatively cool and to clear machinings from work operated upon by said tools in the cutting operation.

14. In a machine of the character described, the combination of a work support, a tool disposed in close proximity therewith, a main driven shaft, a secondary driven shaft, said tool being operated from said main driven shaft, a work feeder operated from said secondary driven shaft reciprocable adjacent said support to feed work thereacross in relation to said tool, a retarder operated in properly timed sequence to said feeder from said secondary shaft adjacent said support opposite said feeder to stop the work in proper relation to said tool, means operated from said secondary shaft to produce relative movement between said tool and said work support in the cutting operation, and adjustable speed transmission between said main and secondary shafts.

15. In a machine of the character described, the combination of a work support, a tool disposed above said support, a feeder reciprocable adjacent said support to move work thereacross in relation to said tool, a retarder adjacent said support on the side opposite said feeder adapted to operate in properly timed sequence with said feeder to stop the work in proper relation with said drill, and means for producing relative movement between said tool and said work support in the cutting operation.

16. In a machine of the character described, the combination of a tool support, a work support, a work feeder for moving work across said support, a continuously driven main shaft, a tool in said tool support operated from said main shaft continuously in the operation of said machine, a secondary shaft driven from said main shaft, cams carried thereby for operating said feeder and to produce relative movement between said work support and said tool in the cutting operation, said cams being adapted to be interchanged to vary the stroke of said feeder and the relative movement between said work support and said tool support, and transmission means between said main and secondary shafts adapted to change the speed of operation of said cams, said transmission including a clutch adapted to be released to permit the manual operation of said secondary shaft in setting the machine for operation.

17. In a machine of the character described, the combination of a tool support, a work support, a continuously driven main shaft, a tool in said tool support operated from said main shaft continuously in the operation of the machine, a secondary shaft driven from said main shaft, a cam carried thereby adapted to produce relative movement between said work support and said tool support in the cutting operation, said cam being adapted to be interchanged to produce a variation in the extent of relative movement between said supports, and transmission means between said main and secondary shafts adapted to change the speed of operation of said cam whereby to produce the cutting operations in slower or quicker succession, as desired, said transmission including a clutch adapted to be released to permit the manual operation of said secondary shaft in setting the machine for operation.

18. In a machine of the character described, the combination of a tool support, a work support, a work feeder for moving work across said support, a continuously driven main shaft, a tool in said tool support operated from said main shaft continuously in the operation of said machine, a secondary shaft driven from said main shaft, cams carried thereby for operating said feeder and to produce relative movement between said work support and said tool support in the cutting operation, said cams being adapted to be interchanged to vary the stroke of said feeder and the relative movement between said work support and said tool support.

19. In a machine of the character described, the combination of a tool support, a work support, a work feeder for moving work across said support, a continuously driven main shaft, a tool in said tool support operated from said main shaft continuously in the operation of said machine, a secondary shaft driven from said main shaft, cams carried thereby for operating said feeder and to produce relative movement between said work support and said tool support in the cutting operation, said cams being adapted to be interchanged to vary the stroke of said feeder and the amount of relative movement between said work support and said tool support, and transmission means between said main and secondary shafts adapted to change the speed of operation of said cams.

20. In a machine of the character described, the combination of a tool support, a work support, a continuously driven main shaft, a tool operated thereby continuously in the operation of the machine, a secondary shaft driven from said main shaft, a cam carried thereby adapted to produce relative movement between said work support and said tool support in the cutting operation, said cam being adapted to be interchanged to produce a variation in the extent of relative movement between said supports, and transmission means between said main and secondary shafts adapted to change the speed of operation of said cam whereby to produce the cutting operations in slower or quicker succession as desired.

21. In a machine of the character described, the combination of a drill continuously driven at substantially constant speed in the operation of the machine, a main driven shaft for driving said drill, a work support movable toward and away from said drill, means for feeding work across said support relative to said drill, means for operating said work support and said feeding means comprising a secondary driven shaft, and transmission means between said main shaft and said secondary shaft, said transmission including a clutch adapted to be released to permit the manual operation of said means for operating said work support and said feeding means during the continued power driven operation of said drill.

22. In a machine of the character described, in combination, a drill head having a plurality of drills, a work support having a guideway adapted to receive a plurality of work blanks, means for effecting a relative approaching and receding movement between said drill head and said work support, means for feeding a series of work blanks along said guideway and for periodically introducing a new blank to said guideway after each operation, a retarding means for engaging the foremost work blank, and a single power means for actuating said first mentioned means, said feeding means and said retarding means in timed relation.

23. In a machine of the character described, in combination, a tool mechanism having a plurality of tools, a work support, means for effecting a relative movement of said support toward and from said tool mechanism, means for periodically introducing a work blank to said work support and for advancing it step by step from one position to another below successive tools, retarding means for said blanks, and means for actuating said first and second mentioned means, and said retarding means in timed sequence.

In testimony whereof, I have hereunto affixed my signature.

WILHELM G. ALDEEN.